(12) United States Patent
DeLamielleure et al.

(10) Patent No.: US 7,854,144 B2
(45) Date of Patent: *Dec. 21, 2010

(54) METHOD OF REDUCING GASEOUS INCLUSIONS IN A GLASS MAKING PROCESS

(75) Inventors: Megan Aurora DeLamielleure, Corning, NY (US); William Weston Johnson, Painted Post, NY (US); Irene Mona Peterson, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 746 days.

This patent is subject to a terminal disclaimer.

(21) Appl. No.: 11/732,463

(22) Filed: Apr. 3, 2007

(65) Prior Publication Data

US 2007/0175241 A1 Aug. 2, 2007

Related U.S. Application Data

(63) Continuation-in-part of application No. 11/193,124, filed on Jul. 28, 2005, now Pat. No. 7,584,632.

(51) Int. Cl.
*C03B 5/225* (2006.01)
(52) U.S. Cl. ..................... 65/136.4; 65/134.1
(58) Field of Classification Search ............... 65/134.4, 65/134.5, 134.1, 136.4; 35/134.5
See application file for complete search history.

(56) References Cited

U.S. PATENT DOCUMENTS

| | | | |
|---|---|---|---|
| 1,953,023 A * | 3/1934 | Mulholland | 65/136.1 |
| 2,331,052 A | 10/1943 | H.A. Shadduck | 49/77 |
| 2,773,111 A | 12/1956 | Arbeit et al. | 13/6 |
| 3,015,190 A | 1/1962 | P. Arbeit | 49/54 |
| 3,669,435 A | 6/1972 | Silverberg | 263/40 R |
| 3,716,349 A | 2/1973 | Deeg et al. | 65/32 |
| 3,811,858 A | 5/1974 | Ernsberger et al. | 65/135 |
| 3,811,859 A | 5/1974 | Ernsberger | 65/135 |
| 3,811,860 A | 5/1974 | Nier | 65/135 |

(Continued)

FOREIGN PATENT DOCUMENTS

DE 101 38 109 9/2002

(Continued)

OTHER PUBLICATIONS

Hanke K P et al., "Influence of Water Vapor on the formation of Bubbles in Sulfate Containing Glass Melts", Glastechnische Berichte, vol. 43, No. 12, Jan. 1, 1970 XP008026801, pp. 475-482.

(Continued)

*Primary Examiner*—Matthew J. Daniels
*Assistant Examiner*—Cynthia Szewczyk
(74) *Attorney, Agent, or Firm*—Kevin M. Able

(57) ABSTRACT

Feed materials are melted in a first vessel to form a glass melt at a first temperature $T_1$, the glass melt containing at least one fining agent. The molten glass is next cooled to a second temperature $T_2$ less than $T_1$ in a second vessel wherein an oxygen-comprising gas is not actively added (e.g. bubbled) into the melt during the duration of the time the melt is at $T_2$. The molten glass is thereafter heated to a third temperature $T_3$ greater than $T_1$ and subsequently formed into a glass article.

28 Claims, 5 Drawing Sheets

U.S. PATENT DOCUMENTS

| | | | | |
|---|---|---|---|---|
| 3,929,440 A | 12/1975 | Oldfield | | 65/32 |
| 3,937,625 A * | 2/1976 | Stewart | | 65/135.6 |
| 3,960,532 A | 6/1976 | Lazet | | 65/22 |
| 4,652,293 A | 3/1987 | Samejima et al. | | 65/134 |
| 5,194,081 A * | 3/1993 | Trevelyan et al. | | 65/29.21 |
| 5,509,951 A | 4/1996 | Baucke et al. | | 65/134.6 |
| 6,334,337 B1 | 1/2002 | Macedo et al. | | 65/134.5 |
| 6,698,244 B1 | 3/2004 | Römer et al. | | 65/134.3 |
| 6,769,272 B2 | 8/2004 | Roeth et al. | | 65/134.9 |
| 6,810,689 B2 | 11/2004 | Römer et al. | | 65/134.1 |
| 6,854,291 B2 | 2/2005 | Romer et al. | | 65/134.5 |
| 6,871,514 B2 | 3/2005 | Muschik et al. | | 65/33.9 |
| 6,992,031 B2 | 1/2006 | Naumann et al. | | 501/69 |
| 7,475,568 B2 | 1/2009 | Bookbinder et al. | | 65/134.9 |
| 7,584,632 B2 * | 9/2009 | House et al. | | 65/134.5 |
| 2001/0039812 A1 | 11/2001 | Romer et al. | | 65/134.1 |
| 2002/0011080 A1 | 1/2002 | Naka et al. | | 65/66 |
| 2002/0023465 A1 | 2/2002 | Ogino et al. | | 65/134.4 |
| 2002/0035855 A1 | 3/2002 | Romer et al. | | 65/134.4 |
| 2002/0069673 A1 | 6/2002 | Kunert et al. | | 65/134.5 |
| 2002/0092325 A1 | 7/2002 | Muschik et al. | | 65/134.3 |
| 2002/0121113 A1 | 9/2002 | Gohlke et al. | | 65/134.4 |
| 2004/0107732 A1 | 6/2004 | Smith et al. | | 65/99.3 |
| 2004/0216490 A1 | 11/2004 | Vetter | | 65/134.4 |
| 2005/0050923 A1 | 3/2005 | Grzesik et al. | | 65/135.6 |
| 2006/0174655 A1 | 8/2006 | Kobayashi et al. | | 65/134.5 |
| 2006/0242995 A1 * | 11/2006 | Bookbinder et al. | | 65/134.1 |
| 2007/0022780 A1 | 2/2007 | House et al. | | 65/29.21 |

FOREIGN PATENT DOCUMENTS

| | | |
|---|---|---|
| DE | 102 53 222 | 4/2003 |
| EP | 1 911 725 | 4/2008 |
| JP | 2003-54958 | 8/2001 |
| JP | 2004091307 | 3/2004 |
| WO | WO 2005/012198 | 2/2005 |

OTHER PUBLICATIONS

Baucke F G K, "Electrochemical Cells for On-Line Maeasurements of Oxygen Fugacities in Glass-Forming Melts", Glass Science and Technology, vol. 61, No. 4, Apr. 1, 1998, XP009074506, p. 87-90.

Jebsen-Marwedel, H. et al., "Glastechnishe Fabrikationsfehler", 1980, Springer, Berlin, XP002485375, pp. 242-243.

* cited by examiner

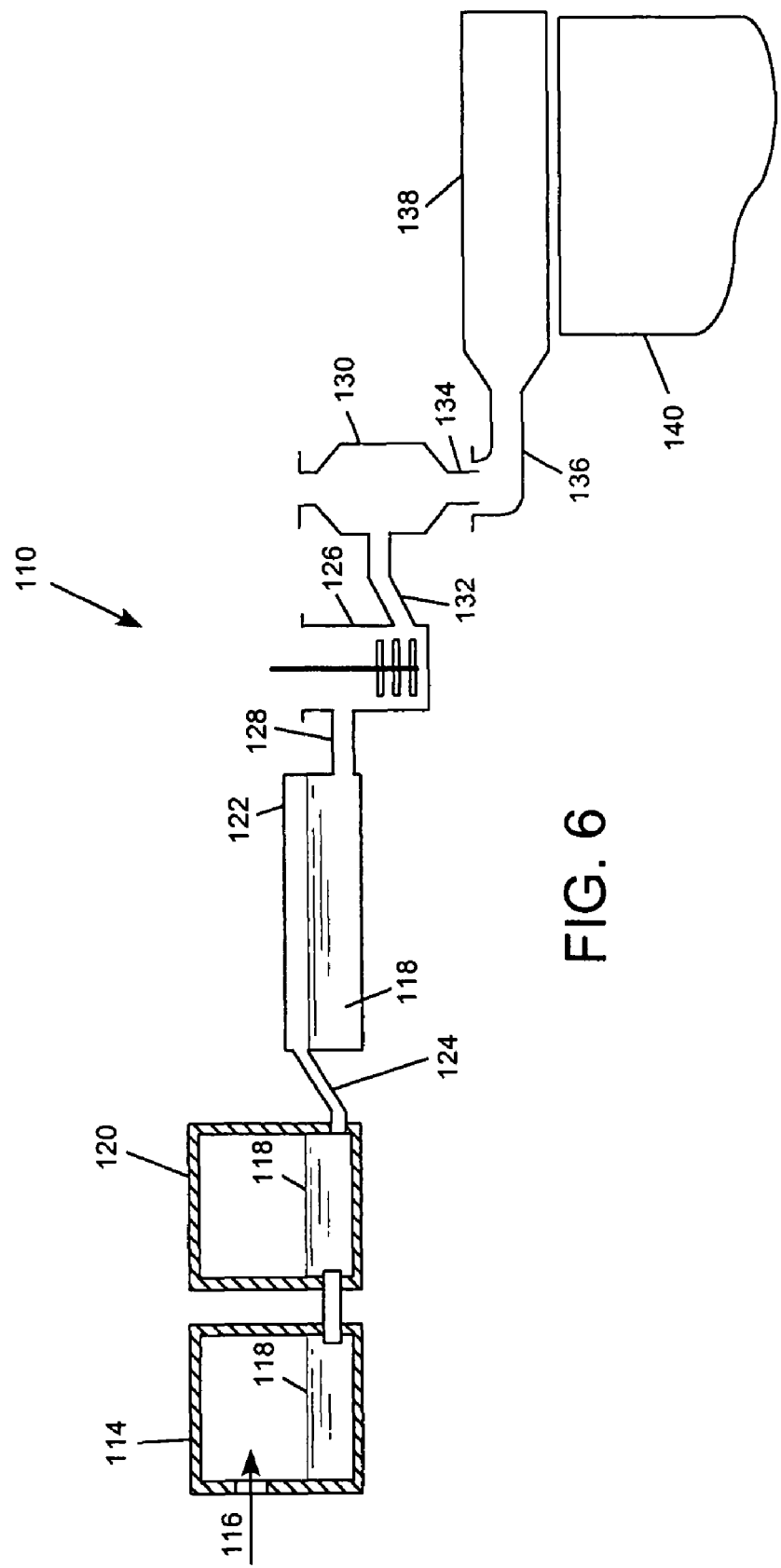

METHOD OF REDUCING GASEOUS INCLUSIONS IN A GLASS MAKING PROCESS

This is a continuation-in-part of U.S. patent application Ser. No. 11/193,124 filed on Jul. 28, 2005 now U.S. Pat. No. 7,584,632, the content of which is relied upon and incorporated herein by reference in its entirety, and the benefit of priority under 35 U.S.C. §120 is hereby claimed.

BACKGROUND OF THE INVENTION

1. Field of the Invention

This invention is directed to a method of reducing gaseous inclusions in a glass making process. The invention is particularly useful for reducing gaseous inclusions in high melting temperature or high strain point glasses, such as those that are used for glass substrates for flat panel display devices.

2. Technical Background

Liquid crystal displays (LCDs) are flat panel display devices that include flat glass substrates or sheets. The fusion process is a preferred technique used to produce sheets of glass used in LCDs because the fusion process produces sheets whose surfaces have superior flatness and smoothness compared to sheet produced by other methods. The fusion process is described, for example, in U.S. Pat. Nos. 3,338,696 and 3,682,609, the contents of which are incorporated herein by reference.

Typically, LCDs are of the amorphous silicon ($\alpha$-Si) thin film transistor (TFT) or polycrystalline-silicon ($\rho$-Si or poly-Si) TFT type. Poly-Si has a much higher drive current and electron mobility, thereby increasing the response time of the pixels. Further, it is possible, using $\rho$-Si processing, to build the display drive circuitry directly on the glass substrate. By contrast, $\alpha$-Si requires discrete driver chips that must be attached to the display periphery utilizing integrated circuit packaging techniques.

The evolution from $\alpha$-Si to $\rho$-Si has presented a major challenge to use of a glass substrate. Poly-Si coatings require much higher processing temperatures than do $\alpha$-Si, in the range of 600-700°. Thus, the glass substrate must be thermally stable at such temperatures. Thermal stability (i.e. thermal compaction or shrinkage) is dependent upon both the inherent viscous nature of a particular glass composition (as indicated by its strain point) and the thermal history of the glass sheet as determined by the manufacturing process. High temperature processing, such as required by poly-Si TFTs, may require long annealing times for the glass substrate to ensure low compaction, e.g. 5 hours at 600° C. These needs have driven glass manufacturers to search for higher melting point glasses. However, high melting point, high strain point glasses present several manufacturing challenges. To begin, the glass should be compatible with current manufacturing methods.

Conventional glass manufacturing processes for LCD glass typically begin by melting glass precursors—feed materials—in a melting furnace. Reactions which occur during this melting stage release gases which form bubbles (also referred to as seeds or blisters) in the glass melt. Seeds may also be generated by interstitial air trapped between particles of the feed materials. In any event, these gas bubbles must be removed in order to produce high quality glass. The removal of gaseous inclusions is generally accomplished by "fining" the glass. For clarity, gaseous inclusions formed as a result of the melting process, whether as reaction products or interstitial gases, will be referred to hereinafter as "seeds".

A common method of fining a glass melt is by chemical fining. In chemical fining, a fining agent is introduced into the glass melt, such as by addition to the feed material. The fining agent is a multivalent oxide that is reduced (loses oxygen) at high temperatures, and is oxidized (recombines with oxygen) at low temperatures. Oxygen released by the fining agent may then diffuse into the seeds formed during the melting process causing seed growth. The buoyancy of the seeds is thereby increased, and they rise to the surface of the glass where the gas is released out of the melt. Ideally, it is desirable that the fining agent release oxygen late in the melting process, after most of the seeds have formed, thereby increasing the effectiveness of the fining agent. To that end, although large seeds may be eliminated in the melter, the glass typically undergoes additional fining in a fining vessel, where the temperature of the glass is increased above the melting temperature. The increase in temperature of the glass melt within the fining vessel reduces the viscosity of the glass, making it easier for seeds in the melt to rise to the surface of the glass, and an oxide fining agent will release oxygen to the melt to cause seed growth and assist with the seed removal process. Once the melt has been fined, it may be cooled and stirred to homogenize the melt, and thereafter formed, such as into a glass sheet, through any one of a variety of available forming methods known in the art.

Many glass manufacturing processes employ arsenic as a fining agent. Arsenic is among the highest temperature fining agents known, and, when added to the molten glass bath in the melter, it allows for $O_2$ release from the glass melt at high temperatures (e.g., above 1450° C.). This high temperature $O_2$ release, which aids in the removal of seeds during melting and in particular during the fining stages of glass production, coupled with a strong tendency for $O_2$ absorption at lower conditioning temperatures (which aids in the collapse of any residual gaseous inclusions in the glass), results in a glass product essentially free of gaseous inclusions.

From an environmental point of view, it would be desirable to provide alternative methods of making glass, and particularly high melting point and strain point glasses typically employed in the manufacture of LCD glass, without having to employ arsenic as a fining agent. Arsenic-containing compounds are generally toxic, and processing of glass with arsenic results not only in manufacturing wastes that are expensive to process, but also creates disposal issues relative to the display device itself after the useful life of the device is exhausted. Unfortunately, many alternative fining agents typically release less oxygen, and/or at too low a temperature, and reabsorb too little $O_2$ during the conditioning process relative to established fining agents such as arsenic, thereby limiting their fining and oxygen re-absorption capabilities. Thus, during the fining stage of the glass production process (i.e. while the glass is within the fining vessel), the fining agent may produce an insufficient quantity of oxygen to effectively fine the glass within the fining vessel.

It would therefore be beneficial to find a process that can reduce gaseous inclusions without the need for the use of toxic fining agents.

SUMMARY

In a broad aspect of the present invention, raw feed materials are heated and melted at a first temperature $T_1$. The resultant glass melt is then cooled to a second temperature $T_2$ less than $T_1$, and a first oxygen-containing gas is introduced into the cooled glass melt at the second temperature $T_2$. The cooled glass melt is then heated to a third temperature T3 equal to or greater than the first temperature $T_1$.

The oxygen-containing gas may be essentially pure oxygen. However, in some instances, the oxygen may be introduced in conjunction with one or more other gases. For example, the oxygen may comprise an air mixture. In a preferred embodiment, a noble gas is also bubbled into the cooled glass melt. The noble gas may be introduced into the cooled glass melt concurrently with the oxygen, either separately or mixed with the oxygen, or introduced at a separate time, such as before the oxygen is introduced. Helium is a preferred noble gas as helium has a high diffusivity in the glass melt.

While not necessary, it is nevertheless desirable that the second temperature is at least 50° C. less than the first temperature. Preferably, the cooled molten glass has a residence time of greater than about 15 minutes during the time the oxygen-containing gas is being introduced into the glass; more preferably the residence time is about 0.5 hours; and most preferably greater than about 1.5 hours.

In one embodiment, a method of fining glass is described comprising the steps of heating a feed material to form a molten glass at a first temperature $T_1$, the molten glass comprising a multivalent oxide material, cooling the molten glass to a second temperature $T_2$ less than $T_1$, bubbling a first gas comprising oxygen through the cooled molten glass at the second temperature, and heating the cooled molten glass to a third temperature $T_3 \geq T_1$. The first gas preferably comprises oxygen in an amount greater than about 5% by volume; more preferably in an amount greater than about 20% by volume. To ensure adequate introduction of the oxygen into the glass melt, it is desirable that a viscosity of the cooled molten glass is less than about 1000 poise.

In some preferred embodiments, a second gas, or mixture of gases, may be introduced into the glass melt. Preferably, the second gas comprises a noble gas, for example helium. The noble gas is introduced into the glass melt while the melt is at the second temperature such as by bubbling the noble gas into the glass melt. Preferably, the molten glass is maintained at the second temperature $T_2$ greater than about 15 minutes.

In another embodiment of the present invention, raw feed materials are heated and melted at a first temperature $T_1$ in a first temperature zone. The resultant glass melt is then cooled to a second temperature $T_2$ less than $T_1$ in a second temperature zone. The cooled glass melt is then heated to a third temperature T3 equal to or greater than the first temperature $T_1$ in a third temperature zone. Preferably, the first, second and third temperature zones occur in separate vessels.

According to some embodiments a gas, such as oxygen, is preferably not actively added to the glass melt during the time the glass melt is at the cooler second temperature $T_2$. The molten glass may then be formed into a glass article. Preferably, the glass article is essentially free of arsenic and/or antimony. The glass article may comprise tin, or other multivalent fining agents.

While not necessary, it is nevertheless desirable that the second temperature is at least 50° C. less than the first temperature. In some embodiments the cooled molten glass has a residence time of greater than about 15 minutes during the cooling phase; in other embodiments the residence time during the cooling phase is about 0.5 hours; and in still other embodiments the residence time during the cooling phase is greater than about 1.5 hours.

In still another embodiment, a method of reducing blisters in a glass making process is disclosed comprising a) melting a batch material in a first temperature zone at a first temperature $T_1$ to form a molten glass; b) cooling the molten glass in a second temperature zone to a second temperature $T_2 < T_1$ c) heating the molten glass in a third temperature zone to a third temperature $T_3 > T_1$; d) forming the molten glass into a glass article, and wherein during the cooling, a gas is not actively added to the molten glass. Preferably, oxygen is not actively added during the molten glass cooling phase.

In yet another embodiment of the present invention, a method of making a glass article is described comprising melting a batch material in a first vessel at a first temperature $T_1$ to form a molten glass, the molten glass comprising at least one multivalent fining agent, cooling the molten glass in a second vessel in fluid communication with the first vessel to a second temperature $T_2 < T_1$, and heating the molten glass in a third vessel in fluid communication with the second vessel to a third temperature $T_3 > T_1$ and forming the molten glass into a glass article.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

BRIEF DESCRIPTION OF THE DRAWINGS

FIG. 6 is a cross sectional side view of an exemplary glass melting process in accordance with an embodiment of the present invention.

DETAILED DESCRIPTION

Figure 1:
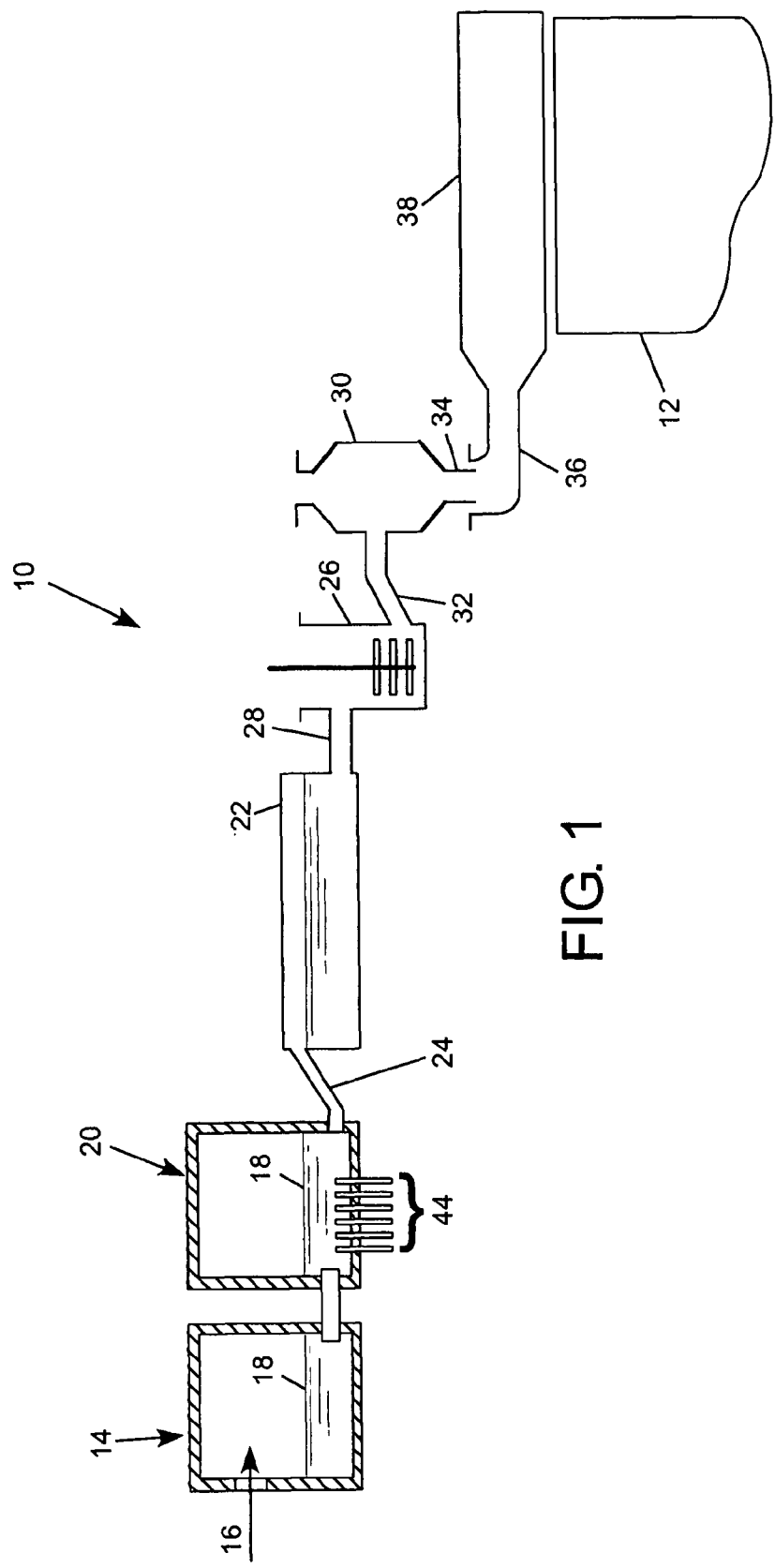
FIG. 1 is a cross sectional side view of an exemplary glass melting process in accordance with an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

In a typical glass making process raw feed materials are heated in a furnace (melter) to form a viscous mass, or glass melt. Furnaces are generally constructed from refractory blocks comprised of burned flint clay, sillimanite, zircon or other refractory material. The feed materials may be introduced into the melter either by a batch process, wherein the glass forming constituents are mixed together and introduced into the melter as a discrete load, or the feed materials are mixed and introduced into the melter continuously. The feed materials may include cullet. The feed materials may be introduced into the melter through an opening or port in the furnace structure, either through the use of a push bar, in the case of a batch process, or in the case of a continuous feed melter, a screw or auger apparatus. The amount and type of feed material constituents makes up the glass "recipe". Batch processes are typically used for small amounts of glass and used in furnaces having a capacity on the order of up to a few tons of glass, whereas a large commercial, continuous feed furnace may hold in excess of 1,500 tons of glass, and deliver several hundred tons of glass per day.

The feed materials may be heated in the melter by a fuel-oxygen flame issuing from one or more burners above the feed material, by an electric current passed between electrodes typically mounted in the interior melter walls, or both. A crown structure above the walls, also made from refractory block, covers the melter and, in a combustion-heated furnace, provides a space for combustion of the fuel.

In some processes, the feed materials are first heated by a fuel-oxygen flame, whereupon the feed materials begin to melt and the resistivity of the feed materials decreases. An electric current is thereafter passed through the feed materials/melt mixture to complete the heating process. During the heating, reaction of the feed materials releases a variety of gases which form inclusions, commonly referred to as blisters or seeds, within the glass melt. Seeds may also form as a result of air trapped within the interstitial spaces between the particles of feed material, and from dissolution of the refractory blocks themselves into the melt. The gases which may constitute seeds may comprise, for example, any one or a mixture of $O_2$, $CO_2$, CO, $N_2$ and NO. Other gases may also be formed and comprise a seed. Water is also a frequent by-product of the melting process.

During the initial stages of melting, the glass melt forms a foamy mass within the melter. Unless seeds are removed, they may be carried through the remainder of the glass forming operations, eventually becoming frozen into the final glass product and resulting in visible imperfections in the product. Foam at the top of the melt may be prevented from exiting the melter by skimming the melt with "floaters" or a bridge wall within the melter. Large seeds within the melt may rise to the surface of the melt, where the gases contained within the seeds are thereby released from the molten glass. Convection currents arising from thermal gradients in the melt aid in homogenizing the melt. However, the residence time of the glass melt in the melter may be insufficient for smaller seeds to be eliminated.

To ensure maximum seed removal, glass manufacturers commonly employ a chemical fining process wherein a fining agent may be included among the feed materials. The fining mechanism of a fining agent is to generate gas in the melt and establish a concentration difference between the gas in the melt and the gas in the seeds to drive seed growth.

Arsenic, typically in the form $As_2O_5$ has been used for years as a fining agent. $AS_2O_5$ is believed to achieve seed-free glass by reducing the arsenic from a valence state of +5 to a valence state of +3 at high temperature, after most melting is complete. This reduction releases oxygen into the melt that diffuses into the seeds, causing the seeds to grow and rise through and out of the melt. Arsenic has the additional advantage of assisting in the removal of any seeds that may remain in the glass during subsequent cooling, conditioning or forming phases of the glass by reabsorbing excess oxygen. As such, arsenic is an outstanding fining agent, producing glass virtually free of gaseous inclusions with very little intervention.

Unfortunately, arsenic is a toxic material. The processing of glass with arsenic results in wastes that are expensive to process and creates disposal issues relative to the finished glass after the useful life of the formed article is exhausted. Accordingly, in certain preferred embodiments, fining is performed such that the finished glass is essentially free of $As_2O_3$, i.e., the finished glass has at most 0.05 mole percent $As_2O_3$. Most preferably, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Antimony oxide ($Sb_2O_5$) may also be utilized as a substitute for arsenic, but antimony is closely related to arsenic in terms of chemical behavior and therefore possesses many of the same challenges as arsenic, such as for waste disposal. In addition, $Sb_2O_3$ raises the density, raises the CTE, and lowers the strain point in comparison to glasses which use $As_2O_3$ or $SnO_2$ as a fining agent. Accordingly, in certain preferred embodiments, fining is performed such that the finished glass is essentially free of $Sb_2O_3$, i.e., the finished glass has at most 0.05 mole percent $Sb_2O_3$. Most preferably, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Tin oxide ($SnO_2$) is another fining agent which has seen use in glass production. However, although tin oxide undergoes similar redox reactions as arsenic, the very low solubility limit of tin oxide at the forming temperature of glasses for display applications (approximately 1200° C.), limits how much can be added to the batch and therefore the amount of oxygen available for fining. Accordingly, the concentration of $SnO_2$ in the finished glass is typically less than or equal to about 0.15 mole percent. Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, $Fe_2O_3$ and halide containing compounds. Indeed, U.S. Pat. No. 6,468,933 describes a glass forming process that employs a mixture of $SnO_2$ and a halide-containing compound in the form of a chloride (e.g., $BaCl_2$ or $CaCl_2$) as fining agents in a system essentially free of arsenic and antimony. Also, these, or other fining techniques, can be used by themselves (or in combinations) without the use of tin fining.

The inventors herein propose a method for enhancing the effectiveness of fining agents, such as, for example, tin oxide, in the formation of a glass. The method broadly comprises forming a glass melt containing a multivalent oxide fining agent at a first temperature, cooling the glass melt to a second temperature less than the first temperature, introducing an oxygen-containing gas into the cooled glass melt at the second temperature, and heating the cooled glass melt to a third temperature higher than the first temperature.

Referring to FIG. 1, there is shown a schematic view of an exemplary glass manufacturing system 10 in accordance with an embodiment of the present invention that uses a fusion process to make glass sheets. The fusion process is described, for example, in U.S. Pat. No. 3,338,696 (Dockerty). The glass manufacturing system 10 includes a melting furnace 14 (melter 14) in which raw feed materials are introduced as shown by arrow 16 and then melted to form molten glass 18. Also included is cooling vessel 20. The glass manufacturing system 10 further includes components that are typically made from platinum or platinum-containing metals such as platinum-rhodium, platinum-iridium and combinations thereof, but which may also comprise such refractory metals as molybdenum, palladium, rhenium, tantalum, titanium, tungsten, or alloys thereof. The platinum-containing components may include fining vessel 22 (e.g. finer tube 22), a cooling vessel to finer connecting tube 24, a mixing vessel 26 (e.g. stir chamber 26), a finer to stir chamber connecting tube 28, a delivery vessel 30 (e.g. bowl 30), a stir chamber to bowl connecting tube 32, a downcorner 34 and an inlet 36. Inlet 36 is coupled to forming vessel 38 (e.g. fusion pipe 38) which forms glass sheet 40. Typically, forming vessel 38 is made from a ceramic or glass-ceramic refractory material.

Figure 3:
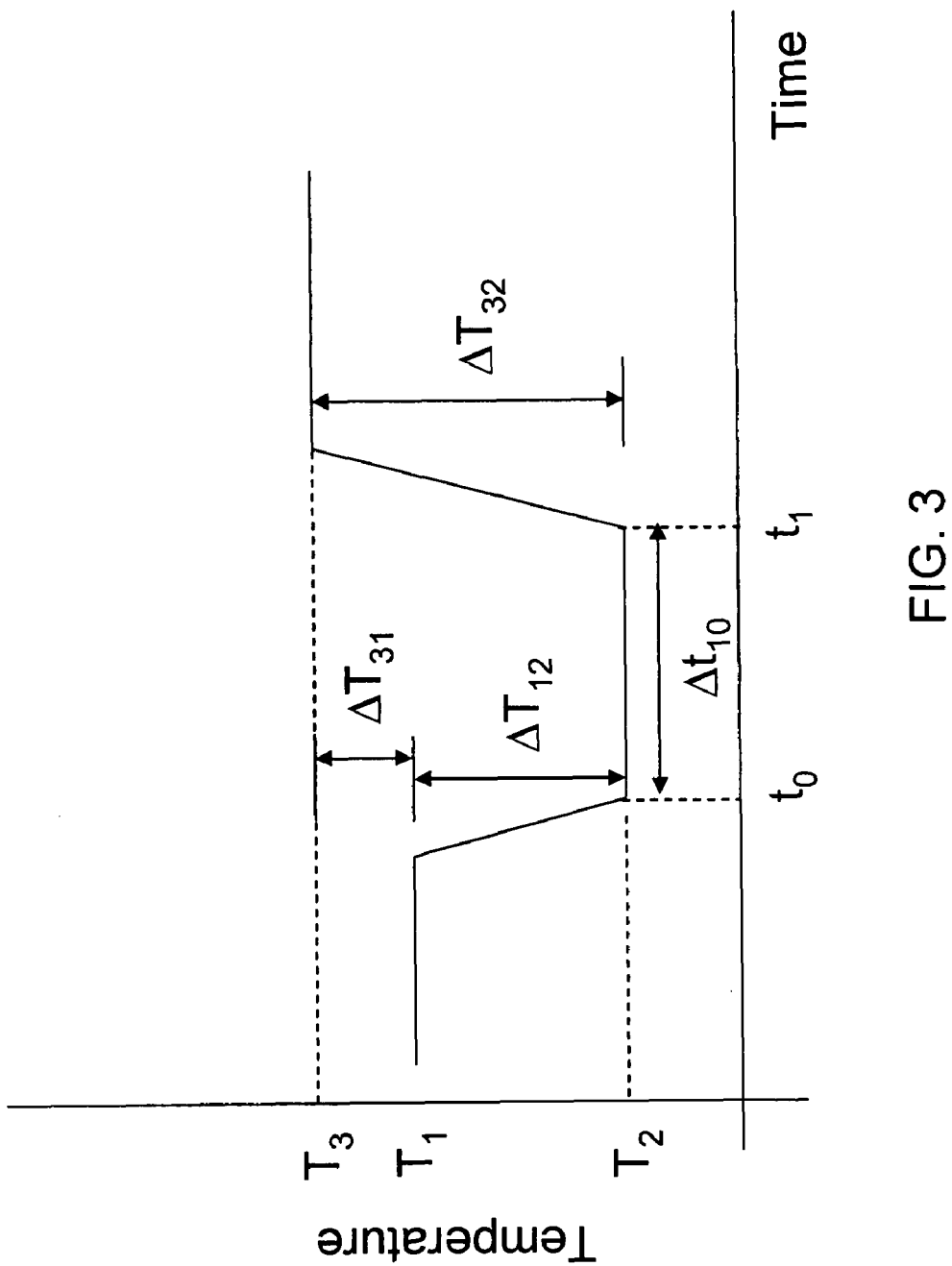
FIG. 3 is a chart showing an exemplary temperature vs. time heating-cooling-reheating schedule for a glass melt in accordance with an embodiment of the present invention.

Glass raw materials are fed into melting furnace 14 in accordance with a recipe specific to the desired glass composition. The raw feed materials may be fed in a batch mode or via a continuous method, and may include, but are not limited to, oxides of Si, Al, B, Mg, Ca, Zn, Sr, or Ba. Feed materials may also be cullet from previous melting operations. As depicted in FIG. 3, the raw feed materials are heated within melting furnace 14 and melted to form glass melt 18 at a first temperature $T_1$. First temperature $T_1$ may vary depending upon the specific glass composition. For display glasses, and in particular hard glasses (i.e. glass having a high melting temperature), melting temperatures may be in excess of 1500 C., more preferably greater than about 1550° C.; more typically at least about 1600° C. A multivalent fining agent, such as $SnO_2$, may be included in the initial feed materials, or may be subsequently added to the melt. Alternatively, in the case of $SnO_2$ in particular as a fining agent, it may be unnecessary to add the $SnO_2$ to the feed materials, as the electrode material in a melting furnace which incorporates electrically heated melting is often comprised of $SnO_2$. Thus, sufficient $SnO_2$ may be added to the melt through the gradual disintegration of the electrodes.

The feed materials may be heated by conventional glass-making methods. For example, the feed materials may be initially heated by way of combustion burners located over the surface of the feed materials. Once a suitable temperature has been attained through the use of combustion burners such that the resistivity of the melt is sufficiently lowered, an electric current may thereafter be passed through the body of the melt between electrodes to heat the melt from within.

Figure 2:
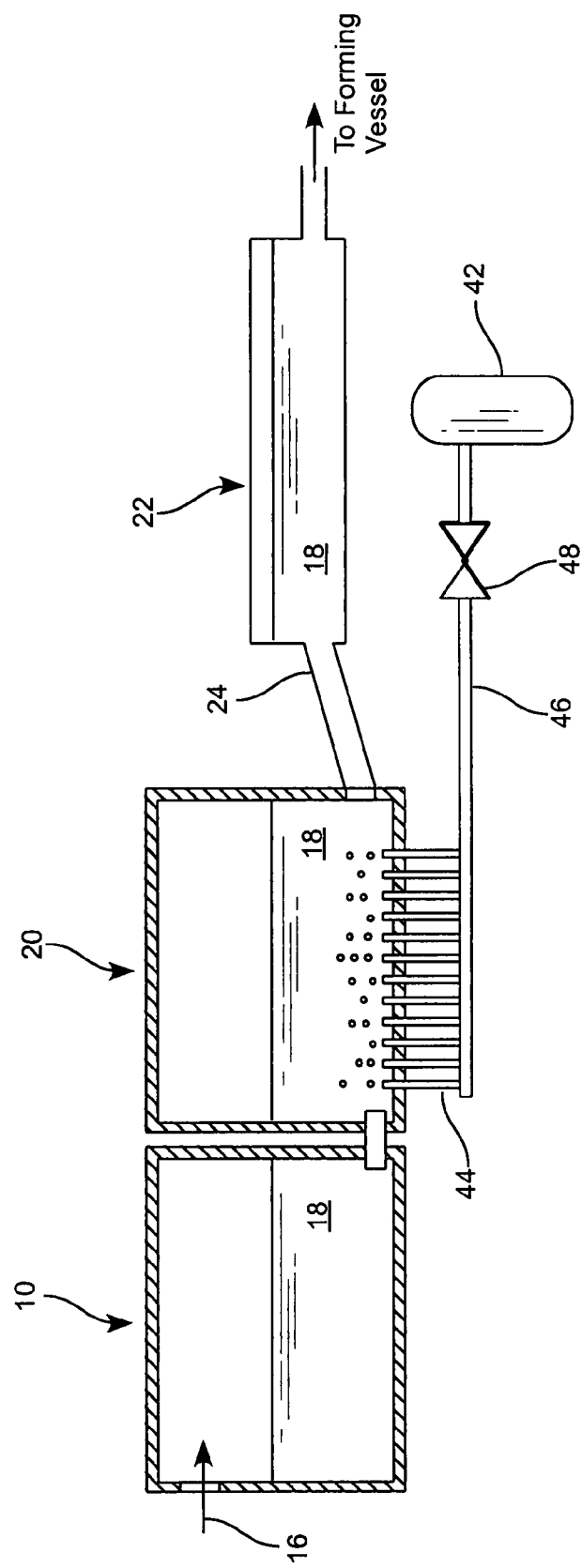
FIG. 2 is a cross sectional side view of a portion of the glass melting process of FIG. 1.

In accordance with the present embodiment, once the raw feed materials have been melted at the first temperature $T_1$, the glass melt is cooled to a second temperature $T_2$ less than $T_1$, and a gas comprising oxygen is introduced into the cooled melt, such as by bubbling. The temperature difference between $T_1$ and $T_2$ is $\Delta T_{12}$ in FIG. 3. The glass melt may be cooled in a vessel separate from melting furnace 14, such as cooling vessel 20 depicted in FIG. 2, or the glass melt may be cooled within the confines of the melting furnace. For example, melter 14 may include compartments or baffles such that one portion of the melter is at least partially segregated from another portion of the melter. As depicted in FIG. 2, the oxygen-containing gas may be supplied to cooling vessel 20 under pressure from gas supply tank 42 to injection tubes 44 through gas header 46. Valve 48 may be used to control the flow of oxygen-containing gas to the glass melt, and may be manually or remotely/automatically controlled. The size of the oxygen-containing gas bubbles introduced into the glass melt through tubes 44 are desirably in a range from about 1 mm in diameter to about 40 mm in diameter, with a typical diameter being about 10 mm. As shown, the oxygen-containing gas is introduced from the bottom of cooling vessel 20. However, the oxygen-containing gas may be introduced from other orientations, such as through tubes entering the melt through the upper surface of the melt or through the sides of cooling vessel 20. In some embodiments, the oxygen-containing gas may be pulsed into the melt rather than introduced at a constant flow rate. That is, the flow of gas is started and stopped at a pre-determined frequency. The frequency of pulses must be sufficiently slow to allow the preceding bubble to ascend away from the outlet of the supply tube and prevent the subsequent bubbles from coalescing at the output of the supply tube.

Without wishing to be bound by theory, it is believed that initially the concentration of the valence states of the multivalent fining agent are in equilibrium at a given temperature and a given partial pressure of oxygen in the melt. For a given melt temperature and partial pressure of oxygen, there is a corresponding redox ratio (which is equal to the concentration of reduced fining agent divided by the concentration of oxidized fining agent). The lower the ratio of $Sn2+/Sn4+$, the more oxygen is held by the fining agent. In a conventional glass making operation, the glass melt is formed at the first, melting temperature (e.g. $T_1$), and is then heated to a second, fining temperature (e.g. $T_2$) higher than the first temperature. The temperature increase from $T_1$ to $T_2$ results in reduction of the fining agent, an increase in the redox ratio, and release of oxygen into the melt. In accordance with the present invention, the temperature of the glass melt is lowered from the first temperature $T_1$ to a second temperature $T_2$ lower than the first temperature, thus creating a driving force for oxidation of the fining agent. An oxygen-containing gas is introduced into the glass melt, decreasing the redox ratio as the fining agent combines with the oxygen. In effect, loading the fining agent with oxygen. The glass melt is then heated to a third temperature higher than the first temperature, driving the fining agent to release this oxygen. Oxygen released from the fining agent may then diffuse into the melt, and the seeds, causing the seeds to grow and rise to the surface of the melt.

It should be noted that introducing oxygen at the first temperature is not nearly as useful as introducing the oxygen after cooling the molten glass. For a given oxygen-containing gas, bubbling at lower temperatures allows the fining agent to store more oxygen than is possible at higher temperatures. Advantageously, the invention decouples the melting and bubbling steps. Melting is done at higher temperatures where it is most efficient (e.g. dissolution kinetics increase with temperature), and bubbling is done at lower temperatures where it is most useful.

In some embodiments the oxygen-containing gas may be pure oxygen. In a preferred embodiment, the gas includes oxygen mixed with one or more other gases. For example, air has been found to produce effective fining of the glass melt. However, the oxygen is preferably mixed with any one or more of the noble (inert) gases, for example, Ar, Xe, Ne, He, Kr, $N_2$ or mixtures thereof under the condition that the partial pressure of oxygen within the mixed-gas bubble exceeds the partial pressure of oxygen within the melt. Advantageously, the use of a noble gas (or mixture thereof), may be used to control the partial pressure of oxygen within the pre-existing seeds. That is, by increasing or decreasing the ratio of noble gas to oxygen, the partial pressure of oxygen within the introduced bubble may be controlled. The noble gas diffuses readily within the melt and into a seed. The partial pressure of oxygen within the seeds is subsequently reduced (the existing gas concentrations within the seed are diluted), thereby increasing the amount of oxygen diffusion into the seeds: the seeds grow in volume and rise to the surface of the melt. Because the diffusivity of helium within the glass melt is especially high relative to the other inert gases, on the order of $3.3 \times 10^{-7} * \exp(-4931/T)$, where T is the temperature in Kelvin, helium is a preferred noble gas. The noble gas may be introduced into the cooled molten glass as a mixture with oxygen, or the noble gas may be introduced into the cooled molten glass separately. That is, it is not necessary that both the noble gas and the oxygen be introduced as a mixture, or even contemporaneously. The introduction of noble gas into the cooled molten glass may begin before the introduction of oxygen and be completed prior to the introduction of the oxygen, or continued during the introduction of oxygen.

As described above, the gas bubbles introduced into the glass melt (including the oxygen-containing gas, or oxygen and a noble gas separately) serve as reservoirs for gases which enhance glass fining through at least three mechanisms. In the first case, if a noble gas such as helium is introduced into the cooled glass melt prior to or contemporaneously with (mixed or not) the oxygen-containing gas, a low partial pressure of the noble gas within the glass melt causes the noble gas to diffuse from the introduced bubble into the melt. The noble gas eventually encounters pre-existing seeds, and diffuses into the seeds. The seeds grow and rise to the surface of the melt. Thus, the noble gas may serve as a physical fining agent.

In the second case, noble gas introduced into the melt may diffuse into pre-existing seeds, thereby reducing the partial pressure of any oxygen within the pre-existing seed to below the partial pressure of oxygen introduced through bubbling. The reduced partial pressure of oxygen within the pre-existing seeds results in additional diffusion of oxygen into the seeds from the bubbled oxygen, thereby further causing seed growth.

In the third case, if the partial pressure of oxygen in the introduced bubble is greater than the partial pressure of oxygen of the melt, oxygen diffusing from the introduced bubble into the glass melt becomes available to replenish (combine with) the fining agent and decrease the redox ratio. The case of tin oxide as a fining agent is given in the equation below as an example of a redox (reduction-oxidation) equation.

$$SnO_2 \Leftrightarrow SnO + \frac{1}{2}O_2 \qquad (1)$$

As the temperature of the melt is increased, equation (1) is driven to the right, reducing the tin and releasing oxygen into the glass melt. A decrease in temperature drives the equation to the left, oxidizing the tin. It should be noted, however, that oxygen is required to oxidize the tin. If sufficient $O_2$ is not available, cooling the melt from $T_1$ to $T_2$ may result in a decrease in the melt $pO_2$ and essentially no change in the relative amounts of SnO to $SnO_2$ (i.e. the redox ratio). The supply of oxygen from introduced bubbles thereby provides the oxygen-depleted fining agent with a ready source of oxygen with which to recombine, thereby replenishing the fining agent. In essence, reducing the temperature of the glass melt provides the force necessary to drive redox equation (1) to the left, and introducing oxygen into the melt facilitates the reaction.

Although it is desirable to reduce the glass melt temperature to as low a second temperature $T_2$ as possible prior to introducing the oxygen-containing gas, thereby maximizing $\Delta T_{12}$ and recombining as much fining agent with oxygen as possible, the viscosity of the glass during the bubbling/cooling phase must be sufficiently low that the introduced gas bubbles will form within the glass melt, and allow sufficient oxygen, and inert gas (if used), to diffuse into the melt. A typical value for $\Delta T_{12}$ is at least about 50° C. However, the temperature of the glass melt during the bubbling/cooling phase, $T_2$, should be such that the viscosity of the glass melt is less than about 1000 poise. Above 1000 poise, the viscosity of the glass may be too high for effective diffusion of the oxygen or oxygen and the noble gas to take place, and it may become difficult or impossible to bubble adequate gas into the melt.

Figure 4:
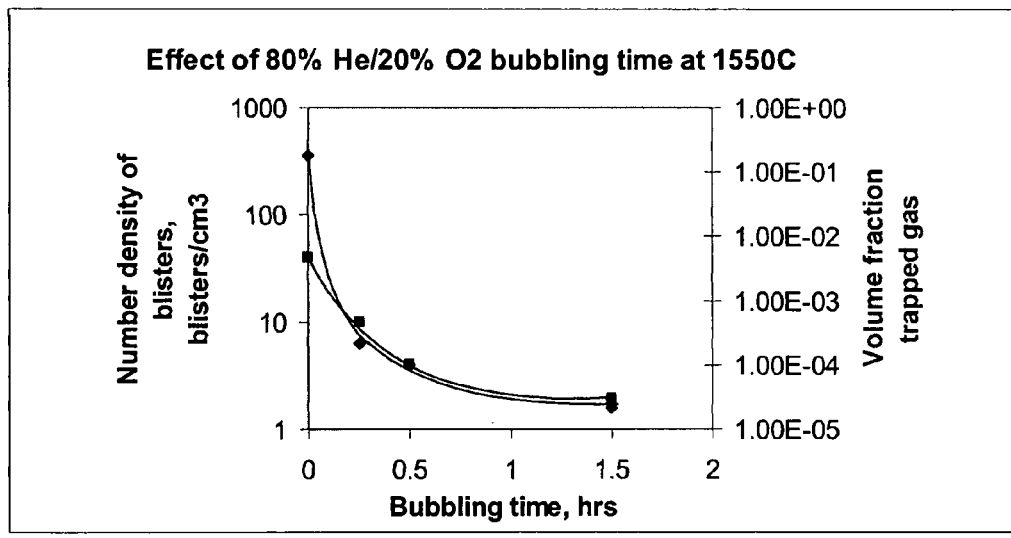
FIG. 4 is a chart showing final blister density and gas volume fraction as a function of bubbling time for an oxygen-containing gas into a glass melt at a cooled temperature.

It is also equally desirable that the glass melt be maintained at second temperature $T_2$ for an amount of time ($\Delta t_{10}=t_1-t_0$) necessary to allow sufficient oxygen to diffuse into the melt. Obviously, the effectiveness of bubbling into the cooled melt is dependent upon the temperature (and therefore viscosity) of the glass melt, the volume fraction of gas which is introduced (bubbled), and the residence time at which the melt is maintained at the reduced second temperature $T_2$. FIG. 4 shows the results of an experiment where a glass melt comprising a fining agent (tin oxide) was made in accordance with the present invention and shows the reduction in seed count (diamonds) within the finished glass as a result of introducing a gas mixture of 80% by volume helium and 20% by volume oxygen into the cooled glass melt. The base glass was Corning Eagle 2000™. FIG. 4 also compares the volume fraction of gas trapped in the melt (squares) as a function of residence time at the reduced second temperature $T_2$ equal to 1550° C., and shows that at 1550° C., the density of seeds (blisters) in the resultant glass, as well as the volume fraction of gas trapped in the melt, are sharply reduced after a residence time $\Delta t_{10}$ of about 15 minutes. After a residence time of about 1.5 hours at $T_2$ the density of seeds (blisters) within the melt is reduced still further.

Figure 5:
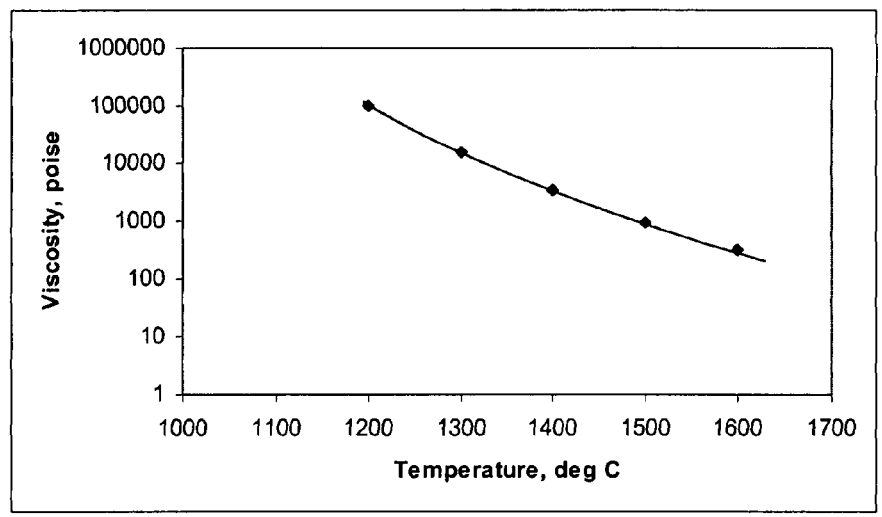
FIG. 5 is a chart showing viscosity as a function of temperature for Corning Eagle 2000™ glass.

FIG. 5 illustrates the temperature-viscosity curve for the glass melt of FIG. 4. As can be seen from FIG. 5, the viscosity of the glass at a second temperature $T_2$ of 1550° C. is about 1000 poise. Preferably, the oxygen-containing gas is bubbled into the glass melt at temperature $T_2$ for at least about 1.5 minutes; more preferably at least about one hour; most preferably at least about 1.5 hours. Preferably, the viscosity of the glass is less than about 1000 poise during the bubbling.

Once the cooling-bubbling phase has been completed, the glass melt is re-heated to a third temperature $T_3$ at least as high as first temperature $T_1$, and preferably greater than first temperature $T_1$. For a glass which has been melted at a temperature $T_1$ of about 1600° C., a typical $\Delta T_{31}$ (=$T_3-T_1$) is about 50° C. However, the value of $\Delta T_{31}$ will depend upon, among other factors, the glass composition. Preferably, $T_3$ is at least about 1600° C.; more preferably at least about 1650° C. The glass melt is preferably maintained at third temperature $T_3$ for at least about 15 minutes. Reheating of the glass melt may, for example, be undertaken in accordance with conventional fining operations as are known in the art, such as within fining vessel 22. While the melt is at third temperature $T_3$, the high temperature causes the fining agent to release oxygen. The oxygen released by the fining agent then becomes available to cause seed growth and removal of existing seeds in the glass melt. Once fining of the glass melt has been completed, the melt is flowed to the stir chamber for homogenization, and then to forming vessel 38 as in a conventional fusion glass making process.

In a conventional fusion glass making process, the molten glass is flowed to fusion pipe 38 (also known as an isopipe or forming wedge), where the glass overflows the upper edges of the fusion pipe. The glass then flows down along converging forming surfaces of the fusion pipe and the separate flows join along the apex of the converging forming surfaces to form a glass sheet. Accordingly, the glass which has been in contact with the converging forming surfaces forms the interior of the glass sheet, and the surface of the glass sheet remains pristine. As indicated earlier, a more detailed description of a fusion glass forming method and apparatus may be found in U.S. Pat. Nos. 3,338,696 and 3,682,609.

Although the invention has been described in detail for the purpose of illustration, it is understood that such detail is solely for that purpose and variations can be made therein by those skilled in the art without departing from the spirit and scope of the invention which is defined by the following claims. For example, although a fusion downdraw method has been used for illustrative purposes, the present invention is applicable to a wide range of glass-making methods. Similarly, the inventive method disclosed herein is not limited to the manufacture of liquid crystal display glass, or necessarily to high melting temperature glasses. Moreover, oxygen need not be introduced into the molten glass in a gaseous form. Oxygen may be introduced through the disassociation of water or through electrolytic methods, as are known in the art.

While effective in reducing the number of blisters per unit weight of finished glass, the above bubbling process presents several hurdles. The effectiveness of the approach depends, inter alia, on the ability to introduce a large volume of small bubbles into the glass melt. In a production environment, where the volume of the glass melt can be quite large, this has proven to be an engineering challenge. Moreover, at the relatively low temperatures of the cooled molten glass, distribution of the oxygen bubbles can be problematic due to the relatively high viscosity of the melt.

As presented previously, the gases produced in the melting process can include $SO_2$, $O_2$, $N_2$, and $CO_2$, among others. These gases manifest themselves as bubbles, or blisters, in the glass melt, which, if not removed, present a significant quality issue for certain applications, such as the manufacture of glass sheets used in the display industry. Some of the formed blisters, particularly the largest having the most buoyancy, are able to rise to the surface of the melt, thereby escaping the molten glass. Very small bubbles, those below a certain threshold diameter, may collapse as the constituent gases are re-dissolved into the melt. However, if the remaining intermediate-sized bubbles, for example, those bubbles having a diameter between about 0.005 mm and about 0.3 mm, are not eliminated and find their way into the finished glass article, the article may be commercially unacceptable.

It has been observed that for some glass compositions at high melting temperatures, for example, at temperatures between about 1500° C. and 1600° C., chemically dissolvable gases can be present in the blister. Again, without wishing to be bound by theory, it is believed that by cooling the molten glass to a suitable temperature range, gases which are chemically-dissolvable in the glass and contained within remaining blisters re-dissolve into the molten glass, causing many smaller blisters to collapse. Thus, the number of blisters entering the third temperature zone is reduced. As the temperature of the molten glass is then raised in the third temperature zone, the dissolved gas or gases come out of solution. However, rather than spontaneously forming additional blisters, the gas or gases enter existing bubbles, thereby increasing the buoyancy of those bubbles. The enlarged blisters are then capable of rising through the melt and escaping through a free surface of the melt. Gases which are chemically dissolvable in the glass include, but are not limited to, oxygen, sulfur dioxide and carbon dioxide.

The inventors herein propose another method for enhancing the effectiveness of blister removal which does not entail the introduction of an oxygen-containing gas into the glass melt. In one embodiment, the method broadly comprises forming a glass melt at a first temperature, cooling the glass melt to a second temperature less than the first temperature, and heating the cooled glass melt to a third temperature higher than the first temperature.

Referring to FIG. 6, there is shown a schematic view of a glass manufacturing system 110 in accordance with an embodiment of the present invention. As before, the illustrated process is a fusion process to make glass sheets. The glass manufacturing system 110 includes a first melting vessel 114 (furnace or melter 114) in which raw feed materials are introduced as shown by arrow 116 and then melted to form molten glass 118. In accordance with the present embodiment, a second vessel 120 is also included for cooling the molten glass. Both vessels 114 and 120 are formed from refractory bricks as previously described, and may be heated by conventional means.

The glass manufacturing system 110 further includes components that are typically made from platinum or platinum-containing metals such as platinum-rhodium, platinum-iridium and combinations thereof, but which may comprise other refractory metals such as molybdenum, palladium, rhenium, tantalum, titanium, tungsten, or alloys thereof. The platinum-containing components may include fining vessel 122 (e.g. finer tube or simply finer 122), a cooling vessel to finer connecting tube 124, a mixing vessel 126 (e.g. stir chamber 126), a finer to stir chamber connecting tube 128, a delivery vessel 130 (e.g. bowl 130), a stir chamber to bowl connecting tube 132, a downcorner 134 and an inlet 136. Inlet 136 is coupled to forming vessel 138 (e.g. fusion pipe 138) which comprises a trough (not shown). Molten glass overflowing the trough runs down converging forming surfaces of the pipe, joining where the surfaces converge to form glass sheet 140. Typically, forming vessel 138 is made from a ceramic or glass-ceramic refractory material.

Glass raw materials are fed into melting furnace 114 in accordance with a recipe specific to the desired glass composition. The raw feed materials may be fed in a batch mode or via a continuous method, and may include, but are not limited to, oxides of Si, Al, B, Mg, Ca, Zn, Sr, or Ba. Feed materials may also be waste glass cullet from previous melting operations. Referring to the exemplary heating-cooling schedule depicted in FIG. 3, the raw feed materials are heated within melting furnace 114 and melted to form glass melt 118 at a first temperature $T_1$. First temperature $T_1$ may vary depending upon the specific glass composition. For hard glasses (i.e. glass having a high melting temperature), and in particular display-type glasses, melting temperatures may be equal to or greater than about 1550° C.; more typically at least about 1600° C. However, feed materials for other glasses may require temperatures above or below this range during the initial melting phase, depending upon the desired glass composition. A multivalent fining agent, such as $SnO_2$, may be included in the initial feed materials, or may be subsequently added to the melt. Alternatively, when $SnO_2$ is employed as a fining agent, it may be unnecessary to add the $SnO_2$ to the feed materials, as the electrode material in a melting furnace which incorporates electrically heated melting is often comprised of tin. Thus, sufficient $SnO_2$ may be added to the melt through the gradual disintegration of the electrodes. It should be noted that a multivalent fining agent is not necessary to practice the present invention, although from a commercial perspective, the use of a fining agent is desirable. That is, while the efficacy of the present invention may in and of itself be suitable for some applications where a simple reduction in blisters is desired, for other applications, such as the manufacture of display glass, it may be desirable to also employ additional fining mechanisms, such as the use of multivalent fining agents, to ensure a virtual elimination of blisters. It is believed that practicing the present invention may be effective in enhancing the effectiveness of such multivalent fining agents by modifying the redox state of the fining agent (to the extent that free oxygen is available in the melt), as lower temperature also favors formation of the more oxidized state of multivalent fining agents.

The feed materials may be heated by conventional glass-making methods. For example, the feed materials may be initially heated by way of combustion burners located over the surface of the feed materials. Once a suitable temperature has been attained through the use of combustion burners such that the resistivity of the melt is sufficiently lowered, an electric current may thereafter be passed through the body of the melt between electrodes to heat the melt from within.

J In accordance with the present invention and as illustrated in FIG. 3, once the raw feed materials have been melted at the first temperature $T_1$ in a first temperature zone, the glass melt is cooled in a second temperature zone to a second temperature $T_2$ less than $T_1$. The temperature difference between $T_1$ and $T_2$ is $\Delta T_{12}$ in FIG. 3. For example, the molten glass from first vessel 114 may be flowed into second vessel 120, the molten glass being cooled in second vessel 120 to a temperature $T_2$ less than $T_1$. $T_2$ is preferably in the range between about 1515° C. and 1555° C. Preferably, second vessel 120 is constructed so as to provide the molten glass contained within the vessel with a free surface. That is, a molten glass surface within vessel 120 which is in contact with an atmosphere above the glass. Preferably, second vessel 120 is approximately one half the volume of vessel 14.

In some embodiments, the temperature difference between $T_1$ and $T_2$ ($\Delta T_{12}$) may be at least about 100° C., with a hold or dwell time ($\Delta t_{10}$) for the molten glass at $T_2$ of at least about 20 minutes. Advantageously, the use of two furnaces or melters (e.g. vessels 114 and 120) having a connection between the two melters located at a low point on each melter, serves to prevent the scum layer on the surface of the glass melt in the first melter (e.g. vessel 114), from transferring to the second melter (e.g. vessel 120).

Once the cooling in the second temperature zone has been completed, the glass melt is re-heated in a third temperature zone to a third temperature $T_3$ at least as high as first temperature $T_1$, and preferably greater than first temperature $T_1$. The first, second and third temperature zones may comprise separate regions within a single vessel, wherein the zones are temperature zones. However, in other embodiments the glass melt is cooled in a vessel separate from melting furnace 114, such as vessel 120 depicted in FIG. 1, which may itself be separately heated (e.g. a furnace) and the cooled but still molten glass then flowed to and reheated in a separate third vessel, such as fining vessel 22. $T_3$ is preferably greater than about 1600° C., and more preferably between about 1630° C. and 1670° C.

For a glass which has been melted at a temperature $T_1$ of about 1600° C., a typical $\Delta T_{31}$ (=$T_3-T_1$) is about 50° C. However, the value of $\Delta T_{31}$ will depend upon, among other factors, the glass composition. The glass melt is preferably maintained at third temperature $T_3$ for at least about 15 minutes. Reheating of the glass melt to $T_3$ may, for example, be undertaken in accordance with conventional fining operations as are known in the art. If the melt contains a fining agent, the high temperature $T_3$ causes the fining agent to release oxygen. The oxygen released by the fining agent then becomes available to cause seed growth and removal of existing seeds in the glass melt. Once fining of the glass melt has been completed, the melt may be flowed to stir chamber 126 for homogenization, and then to forming vessel 138 as in a conventional fusion glass making process.

Thus, by practicing the present invention, a redistribution of the gases present in the melt occurs: gases which are chemically dissolvable in the glass but originally present in the melt in gaseous form are dissolved into the melt, thereby reducing the blister count. The dissolved gas is then brought out of solution during a reheating phase to combine with existing bubbles. Unlike the previous methods, the present invention does not rely on the presence of a multivalent material in the glass, nor does it require the active addition of a gas which is dissolvable in the glass, such as an oxygen-comprising gas, to the glass melt (by active addition what is meant is the addition or injection of a gas through other than natural diffusion through a free surface of the glass melt, such as by bubbling oxygen into the melt or through other methods as are known in the art).

It should be understood that the temperature ranges in the three temperature zones described supra are exemplary. The temperatures may vary depending upon the desired composition of the final glass (and the glass constituents of the batch or feed material).

It is preferable that the temperature of the molten glass in each of the three zones (i.e. vessels 114, 120 and 122) be independently controlled.

Once the molten glass has been fined, the molten glass may be homogenized via a conventional stirring process, and formed into a glass article in a downstream forming process. For example, the molten glass may be formed into a glass sheet through the previously described fusion downdraw process, but other forming processes as are known may also be employed.

The foregoing embodiment has been shown to result in from half as many gaseous inclusions compared to prior art methods, up to about an order of magnitude decrease in gaseous inclusions. For example, at low glass flows (e.g. 26 lbs/hour), the inclusion rate was decreased from about 0.038 inclusions per pound of finished glass to fewer than about 0.007 inclusions per pound of finished glass. At high flow rates (e.g. 50 lbs/hour), the inclusions rate was decreased from about 0.085 blisters per pound of finished glass to fewer than about 0.009 inclusions per pound of finished glass.

Although the invention has been described in detail for the purpose of illustration, it is understood that such detail is solely for that purpose and variations can be made therein by those skilled in the art without departing from the spirit and scope of the invention which is defined by the following claims. For example, although a fusion downdraw method has been used for illustrative purposes, the present invention is applicable to a wide range of glass-making methods, such as float and slot draw. Similarly, the inventive method disclosed herein is not limited to the manufacture of liquid crystal display glass, or necessarily to high melting temperature glasses.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. For example, the inventive method disclosed herein could be used in glass making processes other than the fusion process (e.g. float glass processes), and for products other than glass sheets for display devices. All such modifications and variations are intended to be included herein within the scope of this disclosure and the present invention and protected by the following claims.

What is claimed is:

1. A method of reducing gaseous inclusions in a glass making process comprising:

a) melting a batch material in a first temperature zone at a first temperature $T_1$ to form a molten glass;
b) cooling the molten glass in a second temperature zone to a second temperature $T_2$ at least 100° C. less than $T_1$;
c) holding the molten glass at $T_2$ for at least 20 minutes;
d) heating the molten glass in a fining step in a third temperature zone to a third temperature $T_3>T_1$; and
e) forming the molten glass into a glass article after the fining step.

2. The method according to claim 1 wherein $T_1$ is in a temperature range between about 1550° C. and 1600° C.

3. The method according to claim 1 wherein $T_3$ is greater than about 1600° C.

4. The method according to claim 1 wherein $T_3$ is between about 1630° C. and 1670° C.

5. The method according to claim 1 wherein the glass article is essentially free of arsenic or antimony.

6. The method according to claim 1 wherein each of the first, second and third temperature zones comprises a separate vessel.

7. The method according to claim 1 wherein a gas is not actively added to the glass melt.

8. The method according to claim 1 wherein the glass article comprises tin.

9. A method of forming a glass article comprising:
a) melting a batch material in a first temperature zone at a first temperature $T_1$ to form a molten glass;
b) cooling the molten glass in a second temperature zone to a second temperature $T_2$ at least 100° C. less than $T_1$;
c) holding the molten glass at $T_2$ for at least 20 minutes;
d) heating the molten glass in a third temperature zone to a third temperature $T_3>T_1$;
e) forming the molten glass into a glass article; and wherein a gas is not actively added to the molten glass.

10. The method according to claim 9 wherein $T_1$ is in a temperature range between about 1550° C. and 1600° C.

11. The method according to claim 9 wherein $T_3$ is greater than about 1600° C.

12. The method according to claim 9 wherein $T_3$ is between about 1630° C. and 1670° C.

13. The method according to claim 9 wherein the glass article is essentially free of arsenic or antimony.

14. The method according to claim 9 wherein the molten glass comprises tin.

15. The method according to claim 9 wherein each of the first, second and third temperature zones comprises a separate vessel.

16. A method of forming a glass article comprising:
melting a batch material in a first vessel at a first temperature $T_1$ to form a molten glass, the molten glass comprising at least one multivalent fining agent;
cooling the molten glass in a second vessel in fluid communication with the first vessel to a second temperature $T_2<T_1$;
holding the molten glass at $T_2$ for at least 20 minutes;
heating the molten glass in a third vessel in fluid communication with the second vessel to a third temperature $T_3>T_1$; and
forming the molten glass into a glass article.

17. The method according to claim 16 wherein T1 is between about 1550° C. and 1600° C.

18. The method according to claim 16 wherein $T_2$ is between about 1515° C. and 1555° C.

19. The method according to claim 16 wherein T3 is between about 1630° C. and 1670° C.

20. The method according to claim 16 wherein the molten glass in the second vessel comprises a free surface.

21. The method according to claim 16 wherein temperatures $T_1$, $T_2$ and $T_3$ are independently controlled.

22. The method according to claim 16 wherein the third vessel comprises platinum.

23. The method according to claim 16 wherein the glass article comprises less than or equal to about 0.010 gaseous inclusions with an average diameter greater than about 50µm per pound of glass.

24. The method according to claim 16 wherein the glass article comprises less than or equal to about 0.007 gaseous inclusions with an average diameter greater than about 50µm per pound of glass.

25. The method according to claim 16 wherein the glass article is essentially free of arsenic or antimony.

26. The method according to claim 16 wherein the multivalent fining agent comprises tin.

27. The method according to claim 16 wherein a gas is not actively added to the glass melt during the cooling.

28. The method according to claim 16 wherein oxygen is not bubbled into the glass melt during the cooling.

\* \* \* \* \*

UNITED STATES PATENT AND TRADEMARK OFFICE
CERTIFICATE OF CORRECTION

PATENT NO. : 7,854,144 B2
APPLICATION NO. : 11/732463
DATED : December 21, 2010
INVENTOR(S) : Megan Aurora DeLamielleure et al.

It is certified that error appears in the above-identified patent and that said Letters Patent is hereby corrected as shown below:

| Col. | Line | Description |
|---|---|---|
| 4 | 39 | delete "Coming" and add --Corning-- |
| 7 | 6 | delete "downcorner" and add --downcomer-- |
| 7 | 21 | delete "1500 C." and add --1500°C.-- |
| 12 | 24 | delete "downcorner" and add --downcomer-- |

Signed and Sealed this
Fifteenth Day of February, 2011

David J. Kappos
*Director of the United States Patent and Trademark Office*